KENNETH A. RUDDOCK and
ARTHUR A. BRANT
INVENTORS

Fig-4

BLOCK DIAGRAM OF RECEIVING AND RECORDING APPARATUS

Fig-5

INPUT AMPLIFIER

KENNETH A. RUDDOCK and
ARTHUR A. BRANT
INVENTORS

Fig-9 VARIABLE GAIN AMPLIFIER

Fig-10 TUNED RECEIVER COILS AND FEEDBACK COILS

Fig-11 PHASE SENSITIVE DETECTOR AND RECORDING AMPLIFIER

Fig-14

THE TRANSMITTER CIRCUIT

BLOCKING OSCILLATOR PLATE VOLTAGE WAVEFORM

KENNETH A. RUDDOCK and
ARTHUR A. BRANT
INVENTORS

ATTORNEY

United States Patent Office 2,887,650
Patented May 19, 1959

---

2,887,650

METHOD OF AND APPARATUS FOR GEOPHYSICAL EXPLORATION

Kenneth A. Ruddock, Jerome, and Arthur A. Brant, Clarkdale, Ariz., assignors to Newmont Mining Corporation, New York, N.Y., a corporation of Delaware Application May 4, 1955, Serial No. 505,886

25 Claims. (Cl. 324—6)

---

This invention relates to a method of and apparatus for geophysical exploration and more particularly to an airborne, electro-magnetic arrangement for establishing the existence of a sub-surface conducting ore zone.

The low frequency electro-magnetic method of geophysical prospecting utilizes a large primary coil of several wire turns carrying several amperes of current, such coil being tuned to a generator frequency usually in the range of 400–2000 cycles per second. Magnetic flux lines, generated by such current flow, link with the buried, massive sulphide body, having a conductivity of 1—100 mhos per meter, and generate eddy currents within the body. These eddy currents in themselves generate a secondary magnetic field of the same frequency, but generally somewhat out of phase with respect to the primary field. The secondary field is detected, on or above the ground surface, by a secondary, or pick-up, coil of small area and many turns, such coil preferably being oriented so as not to be directly affected by the primary magnetic field. The pick-up coil is tuned to the frequency of the current applied to the primary coil and connected to a tuned amplifier and detector.

The methods and apparatus used to detect the secondary magnetic field and at the same time eliminate the direct effect of the primary magnetic field in the pick-up coil have been many and varied. Some of the methods which have been proposed, and some which are in use, contain features and utilize techniques which include: the use of a primary coil and pick-up coil having planes at right angles to each other; the measurement of the angle of departure between a primary coil and a pick-up coil, which coils are positioned initially at right angles, and are finally positioned so that the pick-up coil is tilted away from right angles to a position where a minimum signal results at the pick-up coil; the use of a primary coil to form part of a tuned circuit; the measurement of the in-phase and out-of-phase component of the secondary magnetic field; the use of permalloy or other high permeability cored pick-up coils; the use of more than one frequency; the use of more than one pick-up coil; and the use of airborne electro-magnetic arrangements. However, none of the methods and apparatus which utilize these features and techniques are accurate to the point where the data obtained can be relied upon for establishing the location of an ore zone.

Our invention is directed to an airborne method and apparatus which eliminates the undesirable features of the prior methods and apparatus whereby the data obtained is highly accurate and reliable with respect to establishing the location of a sub-surface conducting ore zone. Means are provided for eliminating the effects of the primary coil from the pick-up coil system, the latter being mounted on the same frame as the primary coil and spaced only a few feet therefrom. The apparatus also provides a continuous measurement of the in-phase and out-of-phase components of the secondary voltage in the pick-up coil at a frequency which does not correspond to harmonics of power line frequencies, say 390 cycles per second. Briefly, our invention includes features having the following advantages over prior apparatus.

(1) By orienting the primary and pick-up coils in a zero direct coupling configuration and mounting such coils to maintain such zero coupling relation under all conditions we eliminate all objectionable varying coupling effects. This eliminates the need for electrical cancellation of the direct effects of the primary coil on the pick-up coils and permits the use of the apparatus under flying conditions which cannot be tolerated with most prior apparatus.

(2) By employing a unique feedback technique we eliminate the need for accurate frequency stability of the exciting current in the primary, or transmitter, coil and also the requirement for maintaining a corresponding critical resonant frequency in the receiver apparatus.

(3) Our feedback technique also eliminates the need for using gain stabilized amplifiers.

(4) We employ a novel technique for continuously measuring the in-phase and out-of-phase components of the voltage induced in the pick-up coil system. This is achieved by sampling, at selected times, the amplitude of the total induced voltage. Specifically, the peak amplitude of the in-phase component is obtained by sampling at the instant that the out-of-phase component passes through zero and, similarly, the out-of-phase component is sampled at the time that the in-phase component passes through zero. These voltage components are applied, by feedback technique, to cancel out substantially the total voltage signal induced in the pick-up coil system by the secondary field from the ore body.

(5) As a result of the sampling at the operating frequency of the primary field, it is possible to include in the apparatus a simple circuit having a relatively long time constant thereby substantially eliminating interfering effects of noise signals at other frequencies such as, for example, power line noise.

An object of this invention is the provision of a method and apparatus for use in making geophysical exploration and which is capable of providing diagnostic data having an accuracy and reliability factor exceeding that heretofore possible.

An object of this invention is the provision of a method of establishing the presence of a sub-surface conducting body, which method comprises establishing a primary alternating flux field in the region of the body and measuring the resultant voltage induced in a pick-up coil at the instant the said primary flux field passes through its zero and peak values, respectively.

An object of this invention is the provision of airborne apparatus for use in establishing the location of a subsurface ore body, said apparatus comprising a primary coil and a pick-up coil system oriented to have zero mutual inductance and mounted close together on a common support, means for passing a current of predetermined frequency through the primary coil, means continuously recording the in-phase and out-of-phase components of the voltage induced in the pick-up coil system by a secondary field developed in an ore body, and sampling means for obtaining the measurement of said in-phase and out-of-phase components when the said current passes through its maximum and zero value, respectively.

An object of this invention is the provision of apparatus for use in establishing the location of a subsurface ore body comprising means for establishing an alternating current primary flux field of predetermined frequency in the region of the ore body, a pick-up coil system developing a voltage as a result of eddy currents flowing in the ore body, means including feedback coils inductively coupled to the pick-up coil system for cancelling out substantially all of the voltage induced in the pick-up coil system and means providing measuring the in-phase and out-of-phase components of the remaining error voltage in the pick-up coil system at the instant that the primary flux field pass respectively through its maximum and zero values, means employing the said error voltage components so measured to automatically control the currents in the abovementioned feedback windings in such a manner that a large degree of negative feedback is obtained.

An object of this apparatus is the provision of apparatus for making geophysical explorations comprising a transmitter coil, means for passing an exciting current of predetermined frequency through the transmitter coil, a pair of receiver coils connected in series to the input side of an amplifier, means tuning the receiver coils to the frequency of the exciting current, a reference coil inductively coupled to the transmitter coil but electrostatically shielded therefrom, means for deriving an in-phase reference voltage component from the voltage induced in the reference coil by the exciting current flowing in the transmitter coil, a feedback coil for impressing a reference voltage component into the receiver coil in a sense opposed to the in-phase component of the voltage induced in the receiver coils as a result of eddy currents flowing in a conducting body lying in the field of influence of the primary flux field generated by the transmitter coil, means amplifying the voltage difference between the two said in-phase components, means sampling the magnitude of said voltage difference at the instant the exciting current passes through its maximum value, means to impress an out-of-phase current controlled by the sampler output voltage to the abovementioned feedback coil in degenerative sense to substantially cancel the in-phase voltage in the receiver coils and means measuring the current flowing in the said feedback coil, similar feedback means so operated as to substantially cancel the out-of-phase voltage in the receiver coil, and means measuring the current in these second feedback coils, said measured currents being taken as indicative of the presence of an ore body.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
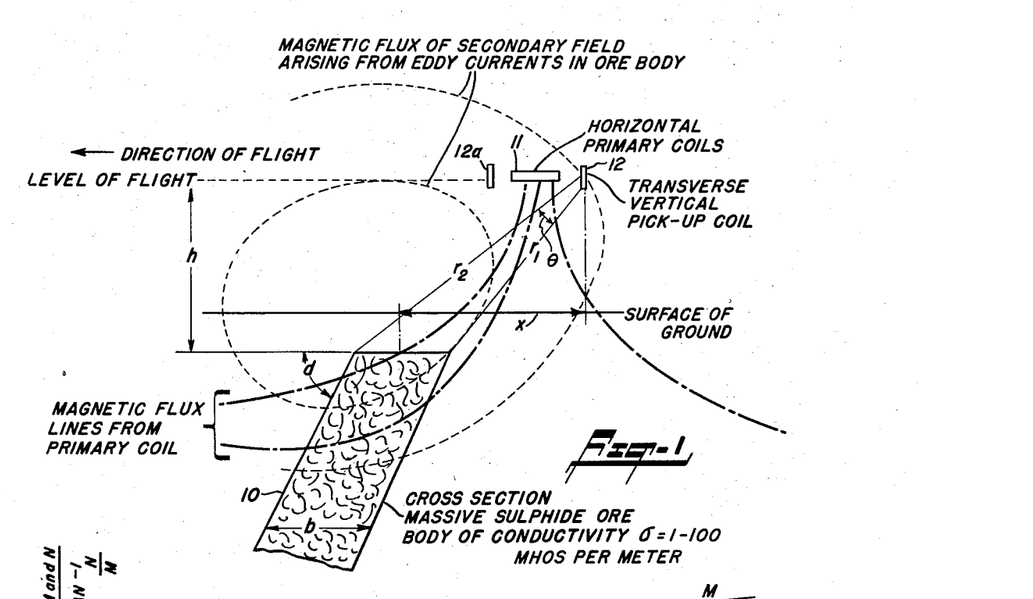
Figure 1 is a diagrammatic representation, in elevation, showing a sub-surface sulphide ore body, elevated primary and pick-up coils and the relative character of the primary and secondary magnetic fields.

Reference is now made to Figure 1 wherein there is shown a steeply dipping massive sulphide body 10 under the shallow cover. It is assumed that an aircraft flies over the body, said craft carrying a primary coil 11 and a pair of pickup coils 12, 12a which pick-up coils are rigidly oriented with respect to the primary coil. The coils may take any suitable shape, such as circular, square, rectangular, etc. For purposes of explanation, however, it will be assumed that the turns of the coils are of a circular shape. The plane of the primary coil (the plane being that plane which extends through the coil perpendicular to the axis of the coil) is roughly horizontal while the planes of each of the pick-up coils (the planes of each of the pick-up coils being similar to the plane of the primary coil; that is the planes which extend through the pick-up coils perpendicular to the axis of each of the coils) are roughly vertically positioned. The planes of each of the pick-up coils are perpendicular to the plane of the primary coil and are approximately at a right angle to the line of flight.

The horizontal secondary field at the pick-up coil, due to eddy currents induced in the sulphide body by the primary field, is:

$$H_s = H_p(M+iN)(\sin^2 d \log r_2/r_1 - \sin d [\cos d]\theta)$$

The horizontal secondary field at the pick-up coil in-phase with the primary field is:

$$H_s' = H_p \cdot M \cdot (\sin^2 d \log r_2/r_1 - \sin d [\cos d]\theta)$$

The horizontal secondary field at the pick-up coil out-of-phase or in quadrature with the primary field is:

$$H_s'' = H_p \cdot N \cdot (\sin^2 d \log r_2/r_1 - \sin d [\cos d]\theta)$$

where;

$H_p$ is the essentially horizontal primary field at the sulphide body,

M and N are parameters related to the conductivity and dimensions of the sulphide body and the frequency used. M is involved in the in-phase and N in the out-of-phase amplitude of the resulting secondary field, $d$ is the dip of the ore body in degrees, $r_2$ and $r_1$ are distances from the upper ore body margins to the pick-up coil, $\theta$ is the angle in radians subtended by the upper ore body width at the pick-up coil, $h$ is the vertical height between top of body and pick-up coil, and X is the horizontal distance between center of body and pick-up coil 12.

Figure 2:
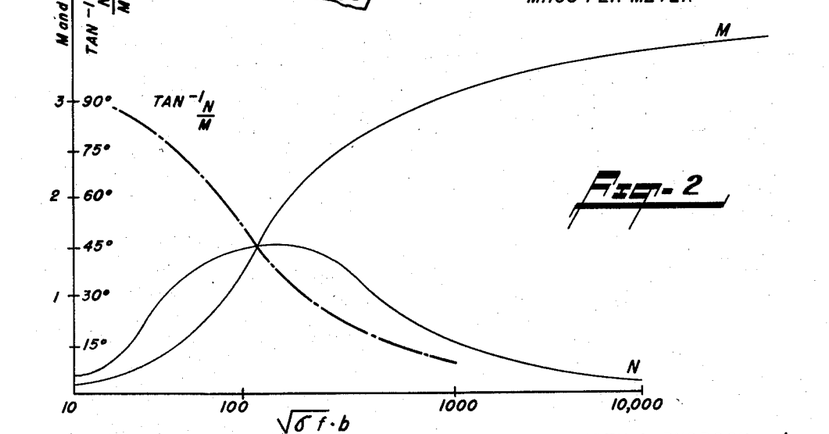
Figure 2 is a set of curves showing the relationship between certain in-phase and out-of-phase parameters M and N (related respectively to the conductivity and dimensions of the sulphide body) and the frequency, $f$, of the current flowing in the primary coil.

The above quantities are depicted in Figures 1 and 2, with Figure 2 showing the parameters M and N, and $\tan^{-1} N/M$ (the phase angle of the secondary field), in their relation to $\sqrt{\sigma f b}$ where:

$\sigma$ is the conductivity of the sulphide body in mhos per meter, $f$ is the frequency of the primary field in cycles per second, and $b$ is the breadth in meters of the sulphide body.

Figure 2 applies for all bodies of long strike length and tabular cross section.

Suppose we have recorded the magnitudes of the in-phase and out-of-phase secondary horizontal component $H'_s$ and $H''_s$. The ratio $H''_s/H'_s = N/M$ and we can thus find the phase angle $\tan^{-1} N/M$. Knowing the phase angle and using the curve for $\tan^{-1} N/M$ in Figure 2 we find a value for $\sqrt{\sigma f b}$ and values of $M$ and $N$ corresponding to this value of $\sqrt{\sigma f b}$. Knowing either $M$ or $N$ and either $H'_s$ or $H''_s$ we can now solve for the dimensions of the body as we now have a value for $$(\sin^2 d \log r_2/r_1 - \sin d [\cos d] \theta) = \frac{H'_s}{H_p M} = \frac{H''_s}{H_p N}$$

If the dip of the body is steep as, is generally the case for massive sulphide occurrences, then $d=90°$, $\cos d=0$, $\sin d=1$ and we thus have a value for $\log r_2/r_1$ which to a first approximation is a value for $$\frac{bX}{X^2+h^2} = \frac{H'_s}{H_p M} = \frac{H''_s}{H_p N}$$

Here $h$ is the height of the aircraft above ground as the cover is usually shallow. $X$ can be read off the response curve as the distance between the center point of the anomaly and any marginal point by which you wish to make the above determinations.

Since $X$ and $h$ are known we thus have a value for $b$ and once $b$ is known, $\sigma$ is derivable from the value of $\sqrt{\sigma f b}$.

The values of $b$ and $\sigma$ usually suffice to tell whether massive sulphides or a surface feature are the cause of the anomaly. Thus, sulphides have $\sigma=1$ to 100 mhos per meter and $b$ from 10 to 100 meters. Terrain or surface features of swamps and lakes have $\sigma=\frac{1}{10}-\frac{1}{100}$ mhos per meter and $b$ usually of 100 meters or more.

If the magnitude of the secondary component is measured at two widely spaced frequencies, these magnitudes can be plotted against frequency on log-log paper and fitted to $M$ or $N$ versus $\sqrt{\sigma f b}$, also plotted on log-log scale. From the fit a value of $M$ or $N$ and $\sqrt{\sigma f b}$ at one of the frequencies is immediately derivable.

It can be shown that terrain features because of their limited thickness behave more as flat lying cylinders (than as vertical sheets) and that for such a case the out-of-phase component rises, i.e. does not reach a maximum until $\sqrt{\sigma f b}=720$ where $b$ is the diameter of the cylinder or breadth of the feature. An average conductivity for a terrain feature is $\sigma=\frac{1}{86}$ mhos per meter whence at 400 cycles $\sqrt{\sigma f b}=\frac{1}{6}\times 20 \times 100=333$. This means that the phase angle is well above 45° for most terrain features. On the other hand, most massive sulphide zones behave as steep dipping sheets or tabular zones. For these the out-of-phase component reaches a maximum at $\sqrt{\sigma f b}=120$, see Figure 2, and thereafter decreases. Now for a value of $\sigma=1$ mho per meter $f=400$ cycles per second and $b=10$ meters $\sqrt{\sigma f b}=200$ so that the phase angle will be well below 45°. Thus, knowledge of the phase angle immediately differentiates between at-surface flat lying terrain conductors and sub-surface steep dipping massive sulphides. If the proper frequency is used, e.g. 400 cycles, as above, then, terrain features will exhibit phase angles greater than 45°, i.e. the out-of-phase component will be greater than the in-phase, and steep dipping massive sulphides 10 meters or more wide will give rise to phase angles less than 45°, i.e. the out-of-phase component will be less than the in-phase. Where the components are about equal, a terrain or surface conductor may actually be covering a massive sulphide body. In such case measurements of either the in-phase or out-of-phase secondary component at a second altitude will resolve the uncertainty.

Measurements of the magnitudes of the in-phase and out-of-phase secondary voltage components at approximately 400 cycle frequency suffice, then, to identify the presence of steep dipping massive sulphides 10 meters or more in width and to differentiate them from surface conducting features such as swamps or muskegs.

To permit measurements of the secondary voltage components it is necessary to eliminate or buck out the effects of the primary field at the pick-up coil or coils. This may be accomplished by orienting the pick-up coil or coils so that there is minimum coupling between them and the primary coil, by using a second pick-up or accessory coil to buck out the effect of the primary field in the first pick-up or actual detector coil, or by making the measurement of the secondary out-of-phase field at the instant the primary field is zero.

Also, to make measurements of the secondary field components it is necessary to maintain relative position and orientation between the primary and pick-up coils or to arrange that relative change of position or orientation does not introduce or change primary field effects.

One way to reduce the direct primary field effect on the pick-up coil is to space the coils far apart with one in the aircraft and the other in a towed bomb or bird. This also has the advantage of getting the pick-up coil nearer the ground and nearer the source of the secondary field. This method is generally selected, for when the primary and pick-up coils are placed together within a few feet of each other on a single rigid frame, the primary field must be compensated out, or eliminated, to the order of one part in one million. However, the towed bird has the disadvantages of changing relative position between pick-up and primary coils, limiting flying to good air conditions, and the necessity of fixing the primary coil to the plane.

If the primary and pick-up coils could be placed together in a single bomb, and the direct effect of the primary field eliminated, then one would have overcome the problem of relative position of pick-up coil to primary coil, the problem of restricted flying, and the problem of ready transference of the apparatus from one type of aircraft to another.

One aspect of the present invention is directed to the provision of apparatus for airborne geophysical exploration, which apparatus provides a continuous measurement of the in-phase and out-of-phase secondary components at a selected low frequency, preferably 390 cycles per second, and which apparatus includes means for eliminating the direct primary field effect from a pick-up system that is located within a few feet of the primary system and mounted with it on the same frame.

The basis of eliminating the direct primary field from the pick-up coil system is to split the pick-up coil system into a grouping or groupings of several pick-up coils all connected in series, i.e. push-pull arrangement. These coils are arranged around the primary coil so that the primary flux through some is from left to right, through others from right to left, so that the sum total of the primary flux through the pick-up coils system is zero. However, since the pick-up coils are all connected in series, all oriented in parallel planes and all within a space of some 10 feet (together with the primary coil), the secondary flux from eddy currents in some sub-surface sulphide body the order of 100 feet away will pass through all the coils in the same direction and be additive.

Various pick-up coil groupings are shown in Figures 2a–2d.

Figure 2A:
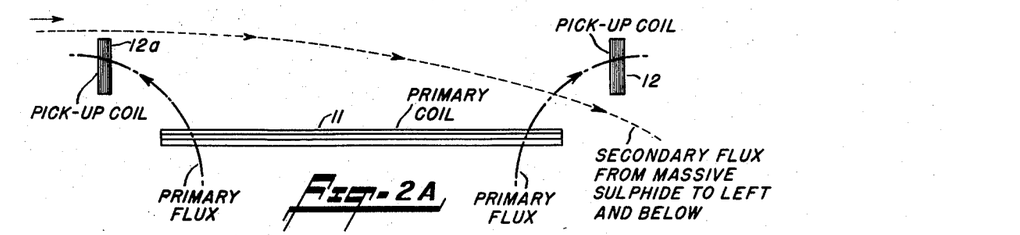
Figures 2a and 2b illustrate, in elevation, various groupings and arrangements of the pick-up coil system designed to eliminate the direct effect of the primary field from the secondary, or pick-up, system.

Figure 2a shows, in elevation, two pick-up coils 12, 12a, symmetrically placed relative to a flat lying or horizontal primary coil 11. The two pick-up coils are oriented vertically whereby the primary flux through them is immediately reduced. Also, these coils lie symmetrically at either end of the primary coil and any flux leakage through one is balanced by the equal flux leakage through the other in the opposite sense. With the two pick-up coils connected in series the net voltage effect of the primary flux leakage is zero. However, the secondary flux from eddy currents arising in a massive sulphide body to the left and below is as shown and passes through both pick-up coils in the same sense. Since the pick-up coils are in series a secondary voltage signal arises.

Figures 2B, 2C:
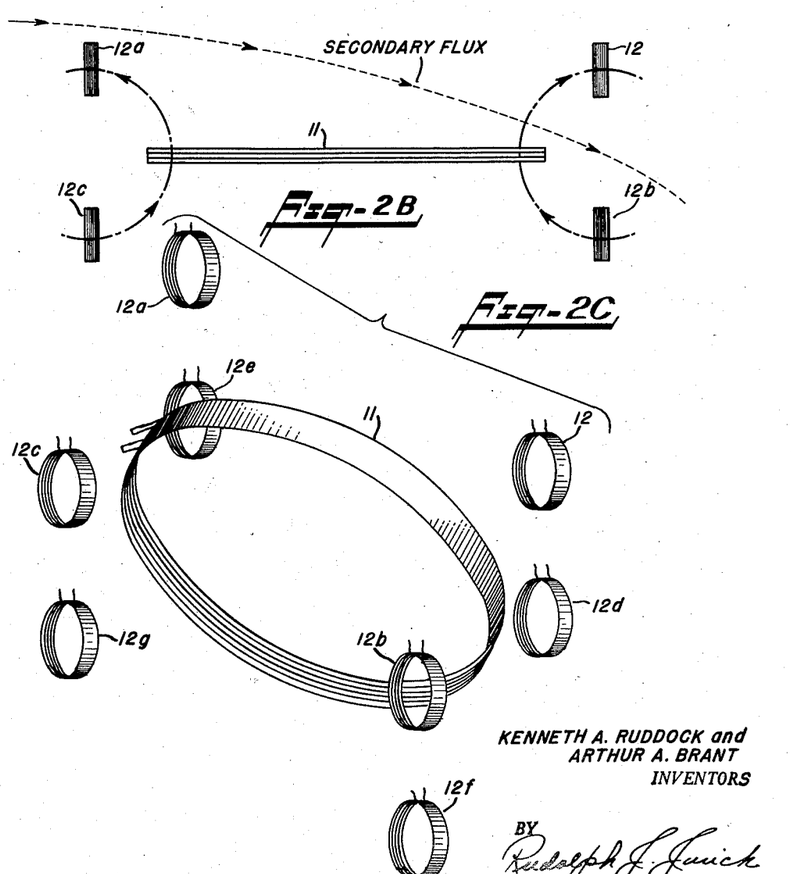
Figure 2c is an isometric view showing an eight coil pick-up system designed for the same purpose.

Figure 2b shows, in elevation, the case of four pick-up coils in vertical planes symmetrically oriented relative to a flat lying primary in such a way that the net primary flux linkage with the pick-up coils connected in series, is zero.

The four pick-up coils may be replaced by eight, four above and four below the plane of the primary coil as shown in isometric in Figure 2c.

Figures 2D, 2E:
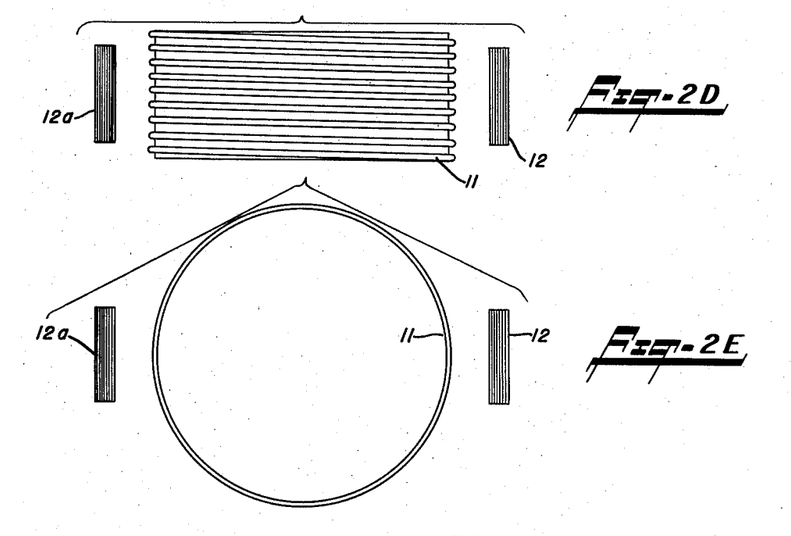
Figures 2d and 2e are elevation and plan views, respectively showing a preferred dimensional relationship between the pick-up coils and the primary coil.

Also, there is some advantage in making the primary coil a vertical solenoid with horizontal windings as shown in the elevation and plan views, respectively, in Figures 2d and 2e, the two symmetrically placed pick-up coils 12, 12a, being wound in vertical planes with dimensions such that they do not project beyond the ends of the primary coil 11.

The above depicted arrangements of pick-up coils symmetrically placed relative to the primary coil in planes at right angles to it, have the advantages of greatly reducing the direct primary field effects which must be held to 1 part in a million, of automatically compensating for change of mutual inductive coupling with temperature expansion or contraction, and of reducing the effects of relative vibrations of the primary coil relative to the pick-ups. This latter advantage is particularly apparent in the arrangement of the eight pick-up arrangement shown in Figure 2c.

Figure 3:
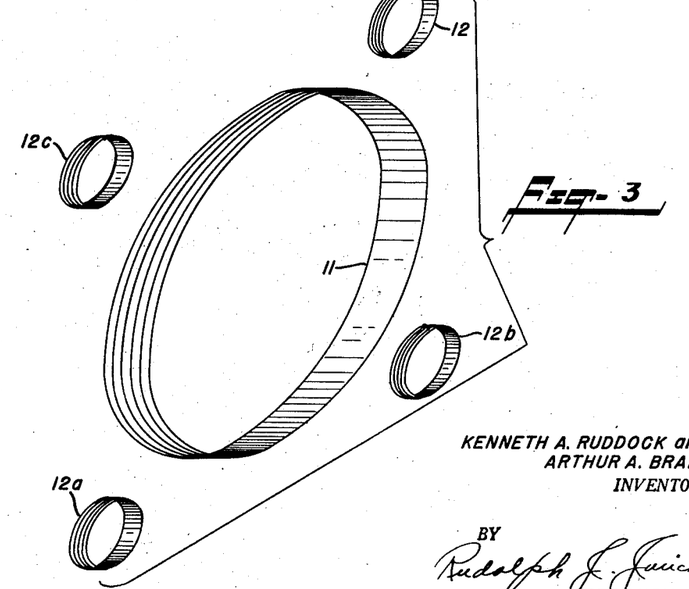
Figure 3 illustrates a primary and pick-up coil arrangement wherein four pick-up coils are oriented in planes parallel to that of the primary coil.

The same principle of splitting up and grouping the pick-up coils can be used for pick-up coils oriented parallel to the primary coil. In Figure 3 the primary coil 11 is wound in the vertical plane and the symmetrical disposed pick-up coils 12, 12a, 12b and 12c are also wound in a vertical plane. When connected in series the primary flux passing through the two pick-up coils in the primary coil axis opposes the flux passing through the pick-up coils above and below. The number of turns on the pick-up coils in this case, would have to be adjusted as the flux densities at all pick-up coil positions are not the same. Also, since the primary and pick-up coil planes are parallel there is not an initial flux density reduction as for the coil planes at right angles, as in Figures 2a–2d.

Hence, by the method of Figure 2 we can arrange a pick-up coil system in which the primary field effects are essentially zero. The arrangement of Figure 2d would be the simplest. For airborne work the primary coil shown would be 4 or 5 feet in diameter and 2 to 2½ feet high. It would carry 50–200 horizontal turns capable of taking up to 10 amps. at 400 cycles. The pick-up coils would be about 2 feet in diameter, wound in the vertical plane with several thousand turns of light wire. The pick-up coils would be symmetrically spaced relative to the solenoid as shown in Figure 2d, so that they were 1 to 1½ feet from the edge of the solenoid.

Several problems must be overcome in the successful design of equipment for an airborne electromagnetic prospecting method. One factor requiring consideration is the coupling between the transmitting and receiving inductances. The common practice is to employ some means of compensating for this coupling and particularly for changes in spacing and orientation between the coils. In our apparatus to be described hereinbelow the direct mutual coupling between the transmitting and the receiving coils is caused to be zero at all times. A second problem is the presence of the aircraft itself. Unless precautions are taken this can result in an interfering signal, and as such greatly reduces the sensitivity of the detecting equipment. In some present day methods the equipment is very rigidly mounted on the aircraft in an effort to maintain its effect at a constant level for which a correction can be made. Another technique is to tow an aerodynamic body containing the sensitive receiving equipment at such a distance behind the aircraft that the effect of the latter is made negligible. In our apparatus provision is made to mount the transmitting and pick-up coils either in the aircraft or in a towed bird. The latter method gives a considerably increased sensitivity due to removal of the aircraft as a source of an interfering noise signal. A third consideration is stability of the equipment. This normally includes the gain stability of amplifiers and operating frequency stability. Because of noise considerations it is usually desirable to keep the detector coil parallel resonant at the operating frequency. Thus, it is necessary to have a very stable frequency source especially if any phase measurements are to be taken. In methods where amplitude measurements are taken it has always been essential that the gain of any amplifiers be very stable. The instrumentation employed in the present invention permits the use of a tuned receiver coil without requiring very strict frequency stability of the tuned receiver coil or the transmitter. Also, the amplifiers need not be gain stabilized. These advantages, together with the fact that the direct mutual coupling between the transmitter and the receiver is eliminated, are the important improvements afforded by our system over other systems heretofore proposed.

The equipment for carrying out the practice of our invention will now be described.

Figure 4:
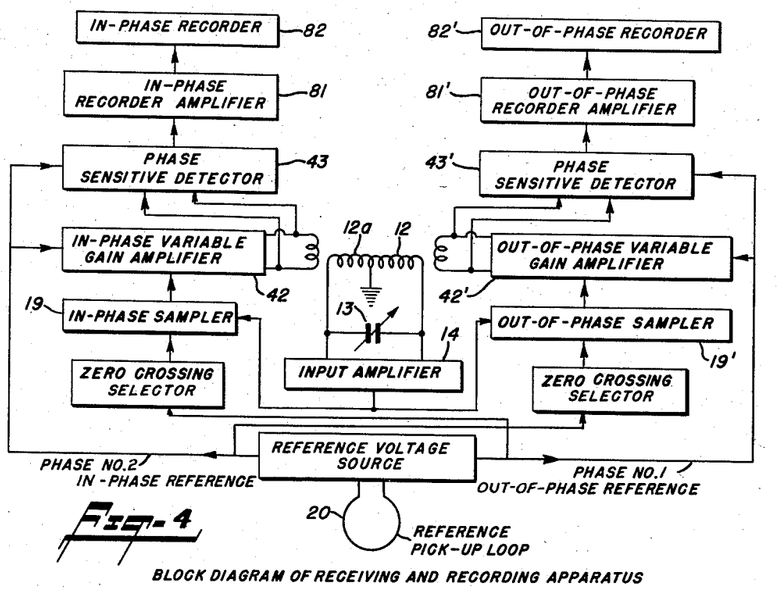
Figure 4 is a block diagram illustrating our receiving and recording apparatus.

Reference is now made to Figure 4 which is a block diagram of the apparatus. The pick-up, or receiver, system comprises two identical coils 12, 12a which coils are so mounted that as near as possible they have zero mutual inductance with the transmitter, or primary, coil. The pick-up coils are then connected in a balanced push-pull manner to obtain a complete cancellation of mutual inductance with the primary coil. Electrostatic shielding is employed around the pick-up coils to reduce the capacitive coupling, and the balanced push-pull arrangement completes the cancellation of any capacitive coupling. A shunting capacitor 13 tunes the pick-up coil system to a predetermined frequency and the coils are connected to an input amplifier 14.

Figure 5:
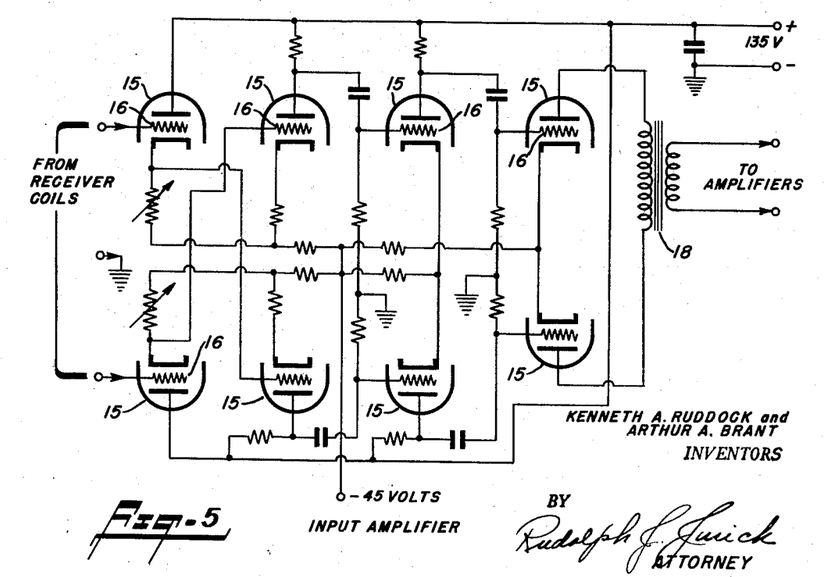
Figure 5 is a circuit diagram of the input amplifiers used to amplify the voltage induced in the pick-up system.

As shown in Figure 5, the input amplifier consists of four tubes 15, such as for example, type 12AT7, having their anodes energized by a 135 volt D.-C. source and their cathodes returned to −45 volts. A special feature of the amplifier is its input stage which, when properly adjusted, is capable of infinite common mode rejection. Thus, an identical signal applied to both of the input grids 16, 16′ will result in zero amplifier output. Therefore, it is possible, by means of the balanced push-pull arrangement of the pick-up coils, to effectively achieve zero capacitive coupling and zero direct mutual coupling with the primary coil. A second feature of the amplifier lies in its design to have a negligible phase shift at the operating frequency. The overall gain of the amplifier, for our purpose, is about 11,000. Except for the special features herein pointed out the amplifier is of conventional design and a more detailed description is believed to be unnecessary. It is here pointed out, however, that the input amplifier is mounted in the pick-up coil assembly so as to maintain the leads from the coils as short as possible. The voltage output of the amplifier, appearing across the secondary winding of the output transformer 18, is applied to a pair of electronic samplers 19, 19′, see Figure 4, which samplers along with the remaining electronic apparatus are preferably located in a rack in the cabin of the aircraft. The connection between the amplifier and the samplers preferably is made by a low impedance line, say 500 ohms.

Figure 6:
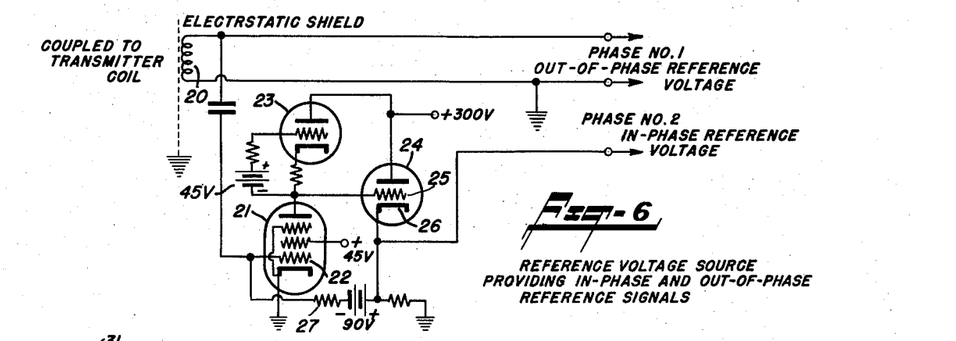
Figure 6 is a circuit diagram showing that portion of the apparatus for obtaining in-phase and out-of-phase reference signals.

The circuit for providing the in-phase and out-of-phase reference voltages relative to the current flowing in the transmitter, or primary, coil is shown in Figure 6. An electrostatically shielded coil 20 is directly coupled to the transmitter coil and the voltage directly induced therein is identified as "Phase No. 1, out-of-phase reference voltage." This voltage, obviously, will be 90 degrees out of phase with respect to the transmitter coil current. A second reference voltage shifted by 90 degrees is provided by an electronic circuit which has unity gain and which causes a 90 degree phase shift over the operating frequency range with an error of less than one minute. Such circuit consists of a very high gain amplifier with a feedback loop so connected that it is a differentiating circuit. The pentode tube 21, such as type 6SH7, has its control grid 22 connected to the ungrounded side of the coupling coil 20. A constant current triode tube 23, such as type 12AX7, forms the load in the plate circuit of the tube 21, the overall gain of the pentode and triode load being about 6,000. A second triode tube 24, also a type 12AX7, has its control grid 25 connected to the plate of the tube 21 and its cathode 26 connected to the control grid of the same tube through a biasing battery and a high resistor 27, thereby forming the feedback loop. Since the second reference voltage, identified as "Phase No. 2, in-phase reference voltage," is shifted 90 degrees relative to the "Phase No. 1 reference voltage," such Phase No. 2 voltage is in phase with the transmitter coil current and is here used as the in-phase reference voltage.

Figure 7:
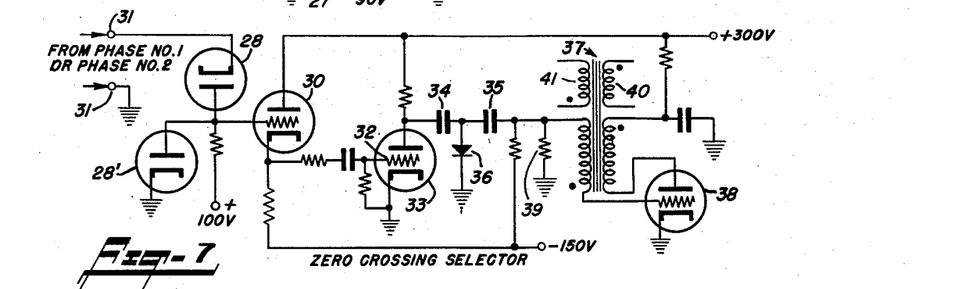
Figure 7 is a diagram of the zero cross-over circuit used to trigger the sampling circuit.

The zero crossing selector circuit shown in Figure 7 supplies the necessary trigger or gate pulses for the samplers. One such circuit is driven by the Phase No. 1 voltage and provides the gate pulse for the in-phase sampler. A second identical circuit is driven by the Phase No. 2 voltage and provides the gate pulse for the out-of-phase sampler. During the positive half cycle of the input sine wave voltage, the grid of triode 30 is held at ground potential by the conducting diode 28'. During the negative half cycle diode 28 conducts, diode 28' does not conduct, and the voltage at the grid of triode 30 follows the negative half of the sine wave. The result is a sharp change from zero voltage to a negative going grid voltage as the input sinusoidal voltage passes through zero in the negative direction. Triode 30 functions as a cathode follower so that the output voltage also has a sharp negative change coinciding with the input zero crossing. Triode 33 is an amplifier operating at zero bias. The input voltage at the grid 32 is a negative pulse produced by the RC coupling from the cathode of triode 30. The resulting wave-form at the plate of triode 33 is a very fast positive going step coinciding in time with the negative going zero crossing of the input sinusoidal voltage. This positive going step is differentiated by the capacitor 34 and the back resistance of the diode 36, giving a very fast positive pulse. The following stage consisting of the triode 38, and the four-winding, pulse transformer 37, forms a monostable blocking oscillator. The grid of triode 38 is normally held just below cut-off by the voltage across the resistor 39. The positive pulse from the previous stage is coupled to the blocking oscillator by capacitor 35. The operation is such that the blocking oscillator is triggered at the exact instant the input sine wave voltage passes through its zero value. It will be noted that the blocking oscillator transformer has two output windings, 40, 41, the utilization of which will be described hereinbelow.

Figure 13:
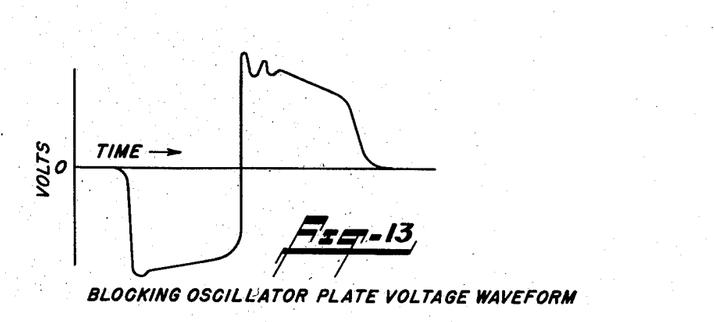
Figure 13 is an oscillograph trace showing the plate voltage waveform of the blocking oscillator.

Figure 13 shows the wave form of the blocking oscillator plate voltage. The negative half cycle is the actual blocking oscillator pulse and is about one-half micro-second duration. The positive half cycle is the overshoot of slightly more than one-half micro-second duration.

As shown in Figure 4, the in-phase and out-of-phase reference voltages, obtained from the circuit of Figure 6, are applied to the in-phase and out-of-phase zero crossing selectors 29, 29' to trigger the samplers 19, 19' and to the identical variable gain amplifiers 42, 42' and the phase-sensitive detectors 43, 43'. It will also be noted that the output of the input amplifier 14 is applied directly to the in-phase and out-of-phase samplers.

Figure 8:
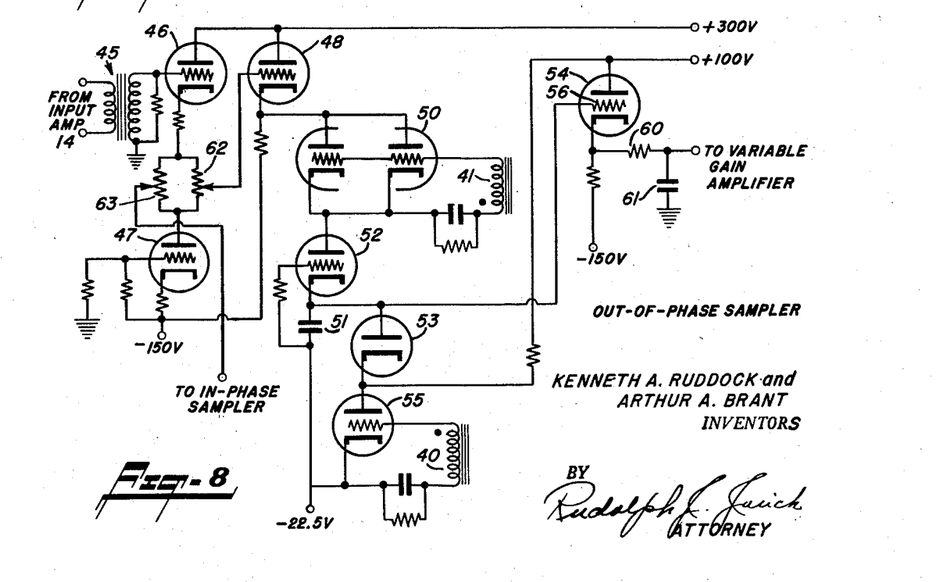
Figure 8 is a diagram of the out-of-phase sampling circuit.

The circuit of the out-of-phase sampler 19' of Figure 4 is shown in Figure 8. It may here be stated that the in-phase sampler differs only in that its trigger signal is 90 degrees out-of-phase with the signal that triggers the out-of-phase sampler. The A.-C. signal output of the input amplifier 14 is coupled by means of the step-up transformer 45 to a cathode follower 46 employing a constant current triode 47 as the negative return in such manner that the A.-C. output signal is obtained at a D.-C. level of −16.5 volts without any appreciable reduction of signal amplitude. The potentiometers 62, 63 provide a means of fine adjustment on the D.C. level at which the A.-C. signal output is obtained. As shown, the potentiometer 62 controls the D.-C. voltage level applied to the out-of-phase sampler circuit whereas the potentiometer 63 serves a similar function with respect to the in-phase sampler. Two identical outputs are taken from this stage; one to the in-phase channel and one to the out-of-phase channel. The following tube 48 is another cathode follower designed to have a low impedance output suitable for driving the sampling gate tube circuit consisting of the triodes 49, 50. The D.-C. level at the cathode of the tube 48 is −1.5 volts. It will be apparent later in the description that the D.-C. level is significant. The A.-C. voltage at this point is the vector sum of the in-phase component and the out-of-phase component of the desired signal. The out-of-phase sampler is triggered in such a manner that an amplitude sample of this vector sum is taken at the exact instant that the in-phase component is zero. This sample is then exactly equal to the peak amplitude of the out-of-phase component. Similarly the in-phase sampler obtains an amplitude sample, when the out-of-phase component is zero, that is exactly equal to the peak amplitude of the in-phase component. The condenser 51 is the sample holding condenser. Very high leakage resistance across this condenser is maintained by the use of negatively biased tubes 52, 53, types 12AX7 and 6AL5, respectively, and the following tube 54, type 6AK5 is designed to have very low grid current. Once each cycle, at the instant that a new sample is to be taken, the voltage across the condenser 51 is first discharged through the clearing tube 55 which may be a 12AU7. The grid of this clearing tube is connected to one of the blocking oscillator transformer windings 40 (see also Figure 7) with polarity such that the tube is caused to conduct readily during the blocking oscillator pulse. During the remainder of each cycle the tube is cut off by a large negative grid leak bias. The sampling gate tube 50 has its grid driven by the other blocking oscillator transformer output winding 41. The polarity of this winding is such that the gate tube conducts readily during the overshoot pulse that immediately follows the clearing pulse described above. During the one-half micro-second sampling time the holding condenser 51 charges to completion through the gate tube 50 and the series triode 52. Over the rest of each signal cycle the gate tube is held below cut off by a large negative grid leak bias.

It is thus apparent that the voltage supplied to the grid 56 of the tube 54 is −1.5 volts, plus or minus a D.-C. voltage proportional to the peak amplitude of the out-of-phase component of the signal. The tube 54 operates as a cathode follower and features very low grid current. Its quiescent bias is −1.5 volts so that the output at its cathode terminal is at ground potential in the absence of a signal. A resistor 60 and capacitor 61 are connected in series from this output to ground. The time constant of this RC combination is such that the condenser voltage can accurately follow signal changes as rapid as those expected when flying over characteristic conducting formations. However, the RC time constant is long enough that the signal frequency sampling technique effectively provides narrow bandwidth filtering.

Figure 9:
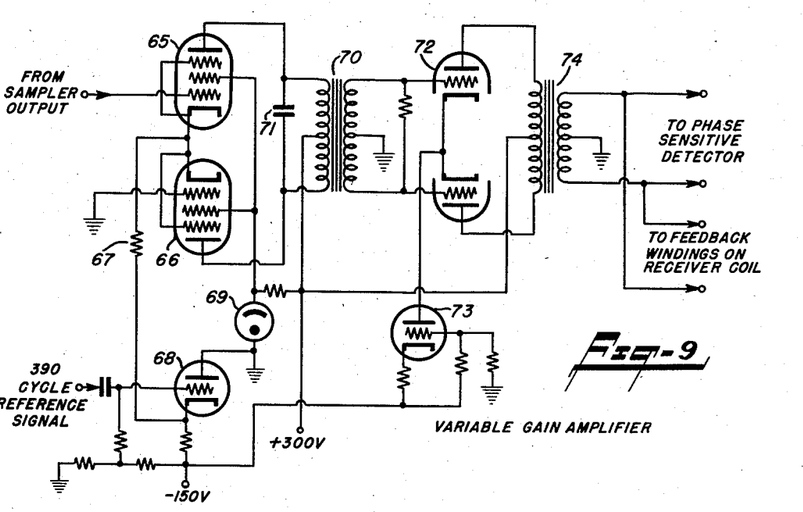
Figure 9 is a circuit diagram of the variable gain amplifiers.

The diagram of Figure 9 shows the circuit of the variable gain amplifier used in the out-of-phase channel of the equipment. The circuit consists of two 5693 pentodes 65, 66 with their plates connected in push pull to an LS-25 interstage transformer 70. The cathodes of the two pentodes are connected together and through a resistor 67 to the negative return point provided by the output of the 12AU7 triode cathode follower 68. The cathode follower also provides the 390 cycle out-of-phase signal injection to the variable gain amplifiers. An OB2 regulator tube 69 provides regulated screen voltage for the pentodes. The output from the out-of-phase sampler is applied to the control grid of one of the pentodes while the control grid of the other pentode is grounded. When the out-of-phase signal is zero the sampler output is at ground potential so that the two pentodes are equally biased. Thus, the pentode transconductances are equal, and the two signal currents in the split primary transformer winding are equal, and in phase, resulting in zero output across the secondary. Potentiometer 62 of Figure 8 provides fine adjustment for setting exact zero output in the absence of an out-of-phase signal. The circuit is such that an out-of-phase signal other than zero will unbalance the pentode circuit and result in a 390 cycle signal output across the transformer secondary. The sense of this secondary signal is reversible depending on the polarity of the out-of-phase signal at the sampling instant. A small trimmer condenser 71 is connected across the transformer primary to eliminate the small phase angle change that would otherwise be caused by the imperfect transformer. The characteristics of this variable gain amplifier are low distortion and good linearity.

Figure 10:
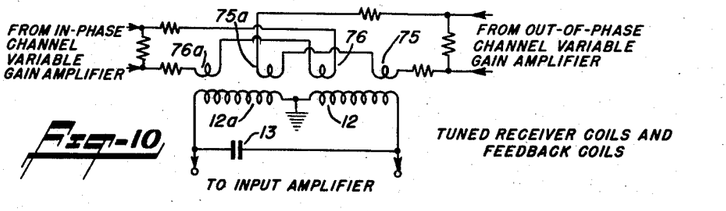
Figure 10 is a diagram of the feedback arrangement associated with the detector coils.
Figure 11:
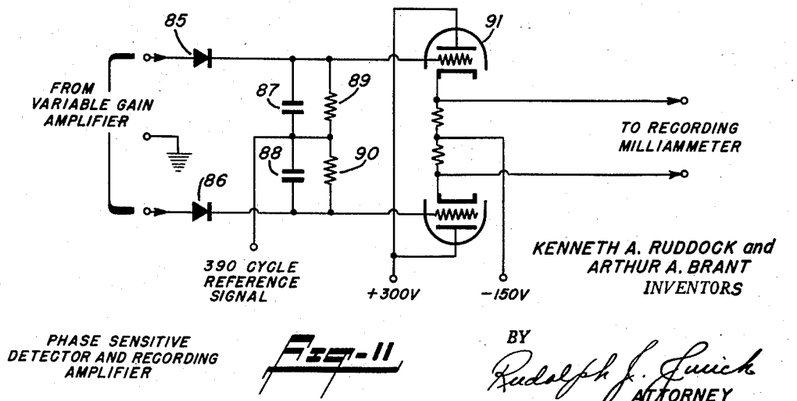
Figure 11 is a circuit diagram of the phase-sensitive detector and recording amplifier.

The transformer secondary is connected to a 12AT7 triode differential amplifier 72 using a constant current 12AU7 triode 73 as the common cathode return. This results in high common mode rejection. The plates of the tube 72 are connected in push pull to an A-26 output transformer 74. The secondary of this transformer is connected by means of a low impedance line to small feedback windings coupled to the receiver coils 12, 12a, as shown in Figure 10. The feedback phasing is such that the field set up by the current in these feedback windings tends to cancel the out-of-phase component of any signal voltage induced in the receiver coils.

The in-phase channel contains identical circuits except that the signal input to the variable gain amplifier is provided by Phase No. 2, the in-phase reference voltage, and the variable bias voltage is provided by the in-phase sampler output. As shown in Figure 10, the output of this amplifier is connected to a second set of small feedback windings 76, 76a closely coupled to the receiver coils. The field set up by the current in these feedback windings tends to cancel the in-phase component of any signal voltage induced in the receiver coils.

Figure 14:
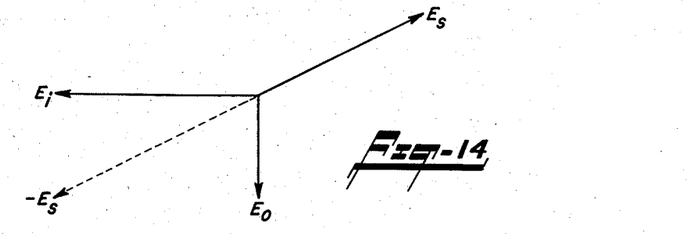
Figure 14 is a vector representation to illustrate the functioning of the equipment.

Figure 14 gives a simple vector representation of the function of the equipment. It is desired to measure the in-phase and out-of-phase components of a signal voltage represented by $E_s$. This is done by determining the amplitudes of an in-phase component $E_i$, and an out-of phase component $E_o$, which are required to cancel $E_s$. This cancellation is accomplished ahead of the receiving coil. Thus, any phase-shift in signal voltage due to detuning of the receiver coil will in effect revolve each of the voltage vectors by the same angle so that the amplitudes of $E_i$ and $E_o$ necessary for cancellation of $E_s$ remain unchanged. Consequently, it can be seen that the transmitter frequency need not be stable to more than one or two percent, depending on the Q of the tuned receiver coil. Some drift of the resonant frequency of the receiver coil can also be tolerated. Because of the feedback system employed, a phase shift of 25°, due to the operating frequency being off the receiver coil resonance, will give an error of only ½ degree in the recorded result as indicated by the in-phase and out-of-phase magnitudes.

From the foregoing description it will be seen that the gain of the variable gain amplifier in the out-of-phase channel is automatically adjusted until the output is of the proper magnitude and sense to cancel (to within one part in 50) the out-of-phase component of the signal voltage. An accurate measure of this component of the signal voltage can thus be obtained by measuring the output of the variable gain amplifier in the out-of-phase channel. Similarly, the output of the in-phase channel variable gain amplifier gives an accurate measure of the in-phase component of the signal voltage.

Referring again to Figure 4, the apparatus utilized to measure and record the respective out-of-phase and in-phase components of the signal voltages appearing in the outputs of the variable gain amplifiers 42, 42', are, respectively, the phase-sensitive detectors 43, 43', the recorder amplifiers 81, 81' and the recorders 82, 82'.

The recorder is equipped with an event marker by means of which it is possible to put identifying marks on the recorder chart as recognizable features on the ground are crossed. Thus, the recorded magnitudes of in-phase and out-of-phase signals can be coordinated with ground position. Areas giving promising anomalies on the airborne equipment can be identified and further careful investigation can be made on the ground.

Figure 12:
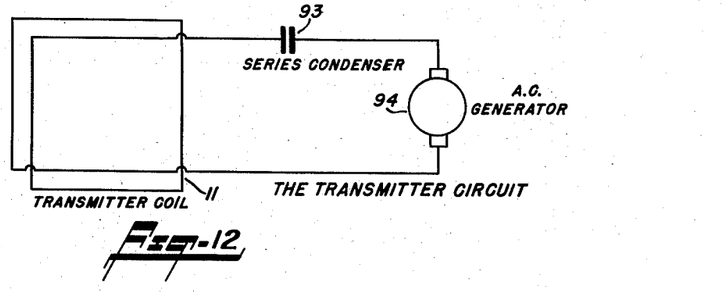
Figure 12 is a circuit diagram of the primary, or transmitter, coil, the series tuning condenser and the A.-C. generator serving as a source of energizing power.

To complete the description of the equipment used to carry out the method of this invention, an explanation of the transmitter section is included. Figure 12 shows the circuit diagram of the transmitter coil, the series tuning condenser 93 and the A.-C. generator 94 which supplies power at the signal frequency to the coil. The coil consists of about 72 turns of #16 insulated wire wound on a frame with an area of about 28 sq. ft. Care is taken to bond each wire securely to the frame to prevent any motion relative to the receiver coils. The coil is tuned to resonance somewhat above the operating frequency by the series condenser. Current at the operating frequency is caused to flow through the series circuit by the A.-C. generator. This generator may be equipped with a conventional carbon-pile type of voltage regulator to maintain constant output voltage and hence constant coil current. The prime mover for the generator may be one of several types depending on the particular application. One possibility is to include the generator as part of a standard aircraft type inverter to be run by the aircraft D.-C. power system. A second possibility, one that is particularly useful when the aircraft is a helicopter, is to use a power take-off on the helicopter engine to drive the generator. The speed of a helicopter engine is normally kept fairly constant and with a little extra effort on the part of the pilot the speed can be kept constant to within about ±2%. This speed regulation is quite satisfactory for the generator drive since it is one of the characteristics of our apparatus that frequency drifts of this order can be tolerated without error. This is a very distinct advantage in the case of helicopter operation since the weight carrying capacity of this type of aircraft is very limited and a direct driven generator is much lighter in weight than a D.-C. generator and inverter combination.

It is also possible to generate the A.-C. signal current by electronic means. However, this type of supply is inefficient and heavier than the above described types and is only justified where precise control of frequency is a necessity.

As previously stated, the primary magnetic field developed by the alternating current flow in the transmitter coil causes eddy currents to flow in a conducting body lying in the primary field. These eddy currents will, in turn, develop a secondary magnetic field having the same frequency as the primary field. Consequently, the presence of an appreciable secondary field is an indication of a conducting body, possibly an ore body. Such a secondary field will result in a secondary signal voltage being induced in the receiver coils and a measurement of the in-phase and out-of-phase components of such signal voltage provides information as to the character of the anomaly. By in-phase is meant that component of the total secondary signal which is exactly in-phase or 180° out-of-phase with the current flowing in the transmitter coil and by out-of-phase is meant that component of the total secondary signal which is exactly 90° out-of-phase with such transmitter coil current.

The apparatus herein described provides an accurate measurement of the in-phase and out-of-phase components without the need of gain stabilized amplifiers and without the need of a particularly stable operating frequency. Also, some drift of the tuned receiving coil resonant frequency is allowable. A further advantage lies in the high degree of filtering inherent in the technique employed. Thus, the equipment can be successfully and accurately used in areas of high noise level as, for example, in areas subject to appreciable electromagnetic fields due to power line frequencies and harmonics thereof, or in the presence of an aircraft such as may be used for transporting the equipment.

An example of the functioning of the equipment as it is transported over the ground will now be given. Normally, the secondary magnetic field produced by the eddy currents in a conducting body will induce a maximum signal voltage of the order of 500 microvolts in the receiver coil with a phase angle relative to the transmitter coil exciting current that can be taken as 50°. Under normal conditions the negative feedback provided by the feedback windings is set so that cancellation of the induced secondary signal is about 98% complete. Thus, the error signal remaining after cancellation will be about 2% of the signal voltage; in this typical case about 10 microvolts with a phase angle of 50° relative to the exciting current. The input amplifier amplifies this error signal without appreciable phase shift so that at the output of the step-up transformer in the sampler circuit the error signal in the typical case is about one volt peak and still has a relative phase angle of 50°.

The reference pick-up loop and the 90° phase shifter operate continuously to provide reference voltages in-phase and out-of-phase with the exciting current. The zero crossing selectors also operate continuously to trigger the samplers. The operation is such that the in-phase sampler is triggered (i.e. takes an amplitude sample) at the instant that the out-of-phase reference voltage passes through zero. Conversely the out-of-phase sampler is triggered at the instant that the in-phase reference voltage passes through zero.

The one volt peak signal is applied to the inputs of the in-phase and out-of-phase samplers. The in-phase sampler, operating when the out-of-phase component is zero, has a signal output of 0.64 volt. This is the in-phase error signal component. The out-of-phase sampler, operating when the in-phase component is zero, has a signal output of 0.77 volt. This is the out-of-phase error signal component. These individual error signal components are then applied to the variable gain amplifiers in their respective channels.

The in-phase channel variable gain amplifier has as its 390 cycle signal source the in-phase reference voltage. Similarly the out-of-phase reference voltage provides the 390 cycle signal input for the out-of-phase channel variable gain amplifier.

The 0.64 volt signal fed to the gain-controlling input of the in-phase channel variable gain amplifier will unbalance the pentode circuit to such a degree that an in-phase voltage of about 3.4 volts will be developed across the output transformer secondary. The 3.4 volts is automatically measured and recorded by the phase sensitive detector, the recorder amplifier and the recording milliammeter. The output transformer secondary is also connected by means of a low impedance cable and a resistor network to the in-phase feedback windings. The resistor network is such that a voltage of 3.4 volts at the input will result in current flow in the feedback windings sufficient to induce in the receiver coils an in-phase voltage of about 315.6 microvolts.

The 0.77 volt signal fed to the gain-controlling input of the out-of-phase channel variable gain amplifier will unbalance the pentode circuit to such a degree that an out-of-phase voltage of about 4.1 volts will be developed across the output transformer secondary. The 4.1 volts is automatically measured and recorded by the phase-sensitive detector, the recorder amplifier and the recording milliammeter. The output transformer secondary is also connected by means of a low impedance cable and a resistor network to the out-of-phase feedback windings. The resistor network is such that a voltage of 4.1 volts at the input will result in current flow in the feedback windings sufficient to induce in the receiver coils an out-of-phase voltage of about 375.3 microvolts.

The 500 microvolt secondary signal voltage induced in the receiver coil at a phase angle of 50° from the exciting current can be reduced to an in-phase component of 322 microvolts and an out-of-phase component of 383 microvolts.

The in-phase negative feedback reduces the residual in-phase component to 322−315.6=6.4 microvolts. The out-of-phase negative feedback reduces the residual out-of-phase component to 383−375.3=7.7 microvolts. These residuals result in the aforementioned error signal of 10 microvolts at a phase angle of 50° from the exciting current.

The equipment is, of course, calibrated so that the 3.4 volt reading recorded by the in-phase channel can be interpreted as resulting from an original induced in-phase signal component of 322 microvolts; and the 4.1 volt reading recorded by the out-of-phase channel can be interpreted as resulting from an original induced out-of-phase signal component of 383 microvolts.

The knowledge of the phase angle of the voltage signal induced in the receiver coils immediately differentiates between at-surface, flat-lying terrain conductors and sub-surface, steep-dipping massive sulphide bodies. Normal terrain features will exhibit phase angles greater than 45°, that is, the out-of-phase component of the induced voltage signal will be greater than the in-phase component. Steep-dipping massive sulphide bodies 10 or more meters wide will give rise to phase angles of less than 45°, that is, the out-of-phase component of the induced voltage signal will be less than the in-phase component. Consequently, in the example given immediately above, the fact that the phase angle of the secondary voltage signal induced in the receiver coils is greater than 45°; namely, 50°, would indicate that the anomaly was due to something other than a highly conducting ore body.

In summary, then, we have shown that it is necessary to measure two quantities; namely, the magnitudes of the in-phase and out-of-phase components of the voltage signal induced in the receiver coils at a given frequency, in order to determine the nature of the body causing the electromagnetic anomaly. However, it will be apparent that the equipment may be suitably calibrated and the actual use thereof standardized whereby the relative magnitude of either the in-phase or out-of-phase signal component at the given frequency may be taken as indicative of the location of a sub-surface conducting body.

Having now described our invention in detail in accordance with the requirements of the patent statutes what we desire to protect by Letters Patent of the United States is set forth in the following claims.

We claim:

1. A method of establishing the presence of a hidden conducting ore body which method comprises establishing a primary alternating magnetic flux field through a selected region of ground, and measuring the components of the resultant secondary flux field arising by reason of eddy currents flowing in a conducting body disposed within the field of influence of the primary field, said secondary flux field components being measured at the instants that the primary field passes through its minimum and maximum values.

2. A method of establishing the presence of a hidden conducting ore body which method comprises establishing, by means of a current carrying loop, an alternating magnetic flux through a selected region of ground, and measuring the resultant voltage induced in a pick-up coil at the instant that the said exciting current passes through its zero value and its peak value, the sense and magnitude of the resulting voltages being taken as indicative of the presence of an ore body.

3. A method of establishing the presence of a hidden conducting ore body which method comprises establishing a primary magnetic flux field by means of an alternating current of predetermined frequency flowing through a transmitter coil, and measuring the out-of-phase component of the resultant voltage induced in a receiver coil at the instant that the said current passes through zero, the magnitude of such voltage component being taken as indicative of the presence of a conducting ore body lying within the field of influence of the primary field.

4. A method of establishing the presence of a hidden conducting ore body which method comprises establishing a primary magnetic field by means of an alternating current of predetermined frequency flowing in a transmitter coil, and measuring the in-phase component of the resultant voltages induced in a receiver coil at the instant that the said current passes through its peak value, the magnitude of such voltage component being taken as indicative of the presence of a conducting ore body lying within the field of influence of the primary field.

5. A method of establishing the presence of a hidden conducting ore body which method comprises passing an alternating current of predetermined frequency and magnitude through a transmitter coil to thereby establish a primary magnetic flux field in the ground, moving the transmitter coil over the ground, and measuring the resultant voltage induced in a receiver coil that is moved simultaneously with the transmitter coil, the sense and magnitude of the resultant voltage at the instant that the said current passes through its zero and maximum values being taken as indicative of the presence of an ore body lying in the field of influence of the primary flux field.

6. A method of establishing the presence of a hidden conducting ore body which method comprises passing an alternating current of predetermined frequency through a transmitter coil to thereby establish a primary magnetic flux field in the ground, moving the transmitter coil along the ground, and measuring the in-phase and out-of-phase components of the resultant secondary voltage induced in a receiver coil that is moved simultaneously with the transmitter coil, the location of an ore zone being taken as that point where an anomalous signal is received such that the out-of-phase component of the resultant voltage is less than the in-phase component.

7. The invention as recited in claim 6, wherein the frequency of the alternating current is 390 cycles per second.

8. A method of establishing the presence of a sub-surface conducting ore body which method comprises moving a transmitter coil and a receiver coil above the ground, passing an alternating current of predetermined magnitude and frequency through the transmitter coil to thereby establish a primary magnetic flux field through the ground, obtaining in-phase and out-of-phase reference voltage components relative to the current flowing in the transmitter coil, applying said reference voltage components to the receiver coil in degenerative sense relative to the signal voltage induced in the receiver coil by reason of eddy currents flowing in an ore body lying within the field of influence of the primary flux field, adjusting the magnitude of the said reference voltage components to substantially cancel out the said signal voltage, the magnitude and sense of the reference voltage components required to obtain the stated cancellation of the signal voltage being taken as indicative of the presence of an ore body lying within the field of influence of the primary flux field.

9. Apparatus for use in establishing the presence of a sub-surface conducting ore body comprising a transmitter coil; means energizing said transmitter coil with an exciting current of predetermined frequency; a pair of receiver coils tuned to the frequency of the exciting current; a reference coil inductively coupled to the transmitter coil and electrostatically shielded therefrom; means deriving in-phase and out-of-phase reference voltage components from the voltage induced in the reference coil by the exciting current flowing in the transmitter coil; means, including two pairs of feed back coils, applying said in-phase and out-of-phase reference voltage components to the receiver coils in opposed sense relative to the signal voltage induced in said receiver coils by a secondary magnetic flux field developed as a result of an ore body lying within the field of influence of the primary flux field developed by the transmitter coil to thereby develop in the receiver coils an error signal; means amplifying said error signal; means sampling said error signal at the instant the exciting current passes through zero to obtain an out-of-phase voltage component of the error signal; means sampling said error signal at the instant the exciting current passes through its maximum value to obtain an in-phase voltage component of the error signal; variable gain amplifiers individually responsive to the said in-phase and out-of-phase voltage components of the error signal; the said two pairs of feedback coils being inductively coupled to the receiver coils, one pair of feedback coils being energized by the output of one of said variable gain amplifiers and the other set of feedback coils being energized by the output of the other variable gain amplifier and the phasing of the feedback coils and the receiver coils being such that the feedback is negative in each case; means adjusting the current in the feedback coils to cancel out substantially the said signal voltage induced in the receiver coils; and means measuring the sense and magnitude of the current flowing in each pair of feedback coils.

10. The invention as recited in claim 9, including a first phase-sensitive detector responsive to the current flowing in one pair of feedback coils and the in-phase reference voltage component to thereby provide an output corresponding to the magnitude and sense of the in-phase component of the signal voltage induced in the receiver coils; and a second phase-sensitive detector responsive to the current in the other pair of feedback coils and the out-of-phase reference voltage component to thereby provide an output corresponding to the magnitude and sense of the out-of-phase component of the said signal voltage.

11. The invention as recited in claim 10, wherein the transmitter and receiver coils are oriented in non-capacitive and non-direct mutual inductive coupling.

12. The invention as recited in claim 10, including means recording the outputs of the phase-sensitive detectors.

13. The invention as recited in claim 10, wherein the receiver coils are spaced on opposite sides of the transmitter coil and lie in planes normal to that of the transmitter coil and the receiver coils are in series and the same sense.

14. The invention as recited in claim 10, wherein each of the receiver coils consists of two windings spaced equally to either side of the plane of the transmitter coil.

15. The invention as recited in claim 10, wherein each of the receiver coils consists of four windings symetrically disposed in a plane normal to that of the transmitter coil.

16. Apparatus for use in geophysical exploration and comprising a transmitter coil; means for passing an exciting current of predetermined frequency through the transmitter coil; an input amplifier; a pair of receiver coils tuned to the frequency of the exciting current and connected in push-pull to the input of the said amplifier; means maintaining the capacitive and direct mutual coupling between the transmitter and receiver coils zero at all times; a reference coil inductively coupled to the transmitter coil but electrostatically shielded therefrom; means deriving in-phase and an out-of-phase reference voltage from the voltage induced in the said reference coil; means taking an amplitude sample of the input amplifier output voltage at the instant the in-phase reference voltage passes through zero and thus obtaining a measure of the out-of-phase signal component; means taking an amplitude sample of the input amplifier output voltage at the instant the out-of-phase reference voltage passes through zero and thus obtaining a measure of the in-phase signal component; a first variable gain amplifier having as its input signal the out-of-phase reference voltage and having its gain controlled by the out-of-phase sampler output, a second variable gain amplifier having as its input signal the in-phase reference voltage and having its gain controlled by the in-phase sampler output; a first pair of feedback coils inductively coupled to the receiver coils and energized by current from the first variable gain amplifier; a second pair of feedback coils coupled to the receiver coils and energized by current from the second variable gain amplifier, the mutual inductive coupling between the feedback coils and the receiver coils in all cases being such that the feedback is negative; a first phase-sensitive detector responsive to the output of the said first variable gain amplifier such that its output is an accurate measure of the out-of-phase component of the signal voltage; a second phase-sensitive detector responsive to the output of the said second variable gain amplifier such that its output is an accurate measure of the in-phase component of the signal voltage; a first amplifier responsive to the output of the said first phase-sensitive detector and having an output suitable for actuating a recording milliammeter; a second amplifier responsive to the output of the said second phase-sensitive detector and having an output suitable for actuating a recording milliammeter; the records so obtained being accurate measures respectfully, of the out-of-phase component and the in-phase component, of the secondary signal voltage induced in the receiver coils as the equipment is transported over the ground; the magnitude and sense of said out-of-phase and in-phase components being taken as indicative of the presence of a conducting body lying within the primary magnetic flux field developed by the transmitter coil.

17. Apparatus for use in establishing the presence of a sub-surface conducting ore body comprising means establishing a primary magnetic flux field through a selected region of ground to induce a resultant secondary magnetic flux field in a conducting body disposed within the influence of the primary magnetic flux field, and means measuring the component of the secondary magnetic flux field at the instant that the primary field passes through the zero value.

18. Apparatus for use in establishing the presence of a sub-surface conducting ore body comprising means establishing a primary magnetic flux field through a selected region of ground to induce a resultant secondary magnetic flux field in a conducting body disposed within the influence of the primary magnetic flux field, and means measuring the component of the secondary magnetic flux field at the instant that the primary field passes through its maximum value.

19. Apparatus for use in establishing the presence of a sub-surface conducting ore body comprising means establishing a primary magnetic flux field through a selected region of ground to induce a resultant secondary magnetic flux field in a conducting body disposed within the field of influence of the primary magnetic flux field, and means measuring the components of the secondary magnetic flux field at the instant that the primary field passes through its minimum and maximum values.

20. Apparatus for use in establishing the presence of a sub-surface conducting ore body comprising a transmitter coil, means passing an exciting current of predetermined frequency through the said transmitter coil, a receiver coil, and means measuring the out-of-phase component of the voltage induced in the receiver coil by a secondary magnetic flux field set up in a conducting body disposed within the field of influence of the primary magnetic flux field, the out-of-phase component of the said voltage induced in the receiver coil being measured at the instant that the exciting current passes through zero.

21. Apparatus for use in establishing the presence of a sub-surface conducting ore body comprising a transmitter coil, means passing an exciting current of predetermined frequency through the said transmitter coil, a receiver coil, and means measuring the in-phase component of the voltage induced in the receiver coil by a secondary magnetic flux field set up in a conducting ore body disposed within the field of influence of the primary magnetic flux field, the in-phase component of the said voltage induced in the receiver coil being measured at the instant that the exciting current passes through its peak value.

22. Apparatus for use in establishing the presence of a sub-surface conducting ore body comprising a transmitter coil, means passing an exciting current of predetermined frequency through the said transmitter coil, a receiver coil, and means measuring the in-phase and out-of-phase components of the voltage induced in the receiver coil by a secondary magnetic flux field set up in a conducting body disposed within the field of influence of the primary magnetic flux field, the in-phase and out-of-phase components of the said voltage induced in the receiver coil being measured at the instant that the exciting current passes through its respective maximum and zero values.

23. Apparatus for use in establishing the presence of a sub-surface conducting ore body comprising a transmitter coil energized by an exciting current of predetermined frequency; means deriving in-phase and out-of-phase reference voltage components from the said exciting current; a pair of receiver coils tuned to the frequency of the exciting current; means applying the said in-phase and out-of-phase reference voltage components to the receiver coils in opposed sense relative to the signal voltage induced in said receiver coils by a secondary magnetic flux field developed as a result of an ore body lying within the field of influence of the primary magnetic flux field developed by the transmitter coil to thereby develop in the receiver coils an error signal; means sampling said error signal at the instant the exciting current passes through zero to obtain an out-of-phase voltage component of the error signal; means sampling said error signal at the instant the exciting current passes through its maximum value to obtain an in-phase voltage component of the error signal; and means applying the said in-phase and out-of-phase voltage components of the error signal to the said means applying the said in-phase and out-of-phase reference voltage components to the receiver coils to thereby adjust the amplitude of the said reference voltage components to cancel out substantially the said signal voltage induced in the receiver coils.

24. The invention as recited in claim 23 including means measuring the magnitude and sense of the said in-phase and out-of-phase reference voltage components fed to the receiver coils.

25. Apparatus for use in establishing the presence of a sub-surface conducting ore body comprising a transmitter coil; means energizing said transmitter coil with an exciting current of predetermined frequency; means deriving in-phase and out-of-phase reference voltage components from the said exciting current; variable gain amplifiers individually fed by the said in-phase and out-of-phase reference voltage components; a pair of receiver coils tuned to the frequency of the exciting current; two pairs of feedback coils inductively coupled to the receiver coils, one pair being energized by the output of one of the said variable gain amplifiers and the other set of feedback coils being energized by the output of the other variable gain amplifier, the said in-phase and out-of-phase reference voltage components being applied to the receiver coils in opposed sense relative to the signal voltage induced in said receiver coils by a secondary magnetic flux field developed as a result of an ore body lying within the field of influence of the primary flux field developed by the transmitter coil to thereby develop in the receiver coils an error signal; means amplifying said error signal; means sampling said error signal at the instant the exciting current passes through zero to obtain an out-of-phase voltage component of the error signal; means sampling the said error signal at the instant the exciting current passes through its maximum value to obtain an in-phase voltage component of the error signal, the said in-phase and out-of-phase voltage components of the error signal providing means adjusting the said in-phase and out-of-phase reference voltage components in the feedback coils to thereby cancel out substantially the said signal voltage induced in the receiver coils; and means measuring the sense and magnitude of the current flowing in each of the said pair of feedback coils.

References Cited in the file of this patent

UNITED STATES PATENTS

| | | |
|---|---|---|
| 1,820,953 | Sundberg | Sept. 1, 1931 |
| 2,370,692 | Shepherd | Mar. 6, 1945 |
| 2,489,920 | Michel | Nov. 29, 1949 |
| 2,741,736 | Puranen | Apr. 10, 1956 |